United States Patent
Hillery

(10) Patent No.: US 12,394,851 B2
(45) Date of Patent: Aug. 19, 2025

(54) DEVICE FOR SECURING A REPLACEABLE VEHICLE BATTERY

(71) Applicant: Thomas H. Hillery, Henderson, NV (US)

(72) Inventor: Thomas H. Hillery, Henderson, NV (US)

( * ) Notice: Subject to any disclaimer, the term of this patent is extended or adjusted under 35 U.S.C. 154(b) by 0 days.

(21) Appl. No.: 18/637,357

(22) Filed: Apr. 16, 2024

(65) Prior Publication Data

US 2024/0380049 A1 Nov. 14, 2024

Related U.S. Application Data

(63) Continuation of application No. 17/351,686, filed on Jun. 18, 2021, now Pat. No. 11,962,028.

(51) Int. Cl.
*H01M 50/244* (2021.01)
*B60L 50/64* (2019.01)
*H01M 50/249* (2021.01)
*H01M 50/264* (2021.01)

(52) U.S. Cl.
CPC ............ *H01M 50/244* (2021.01); *B60L 50/64* (2019.02); *H01M 50/249* (2021.01); *H01M 50/264* (2021.01); *H01M 2220/20* (2013.01)

(58) Field of Classification Search
CPC ..................................................... H01M 50/20
See application file for complete search history.

*Primary Examiner* — Barbara L Gilliam
*Assistant Examiner* — Jordan E Berresford
(74) *Attorney, Agent, or Firm* — Newman Law, LLC

(57) ABSTRACT

A device for securing a replaceable vehicle battery having a protruding positive terminal and a protruding negative terminal, including a substrate defining a first side and a second side, a first receiving port extending through the substrate, a second receiving port extending through the substrate, and first and second clamps mounted on the second side of the substrate, wherein the first receiving port and second receiving port are positioned and dimensioned to receive the positive and negative terminals through the first side of the substrate, whereby the first and second clamps respectively engage the positive and negative terminals on the second side of the substrate.

19 Claims, 6 Drawing Sheets

DEVICE FOR SECURING A REPLACEABLE VEHICLE BATTERY

BACKGROUND OF THE INVENTION

The invention relates generally to devices and methods for fastening and unfastening a battery, particularly batteries used for vehicles, whether mounted in an engine compartment or elsewhere on the vehicle or machine, which makes it less difficult and time-consuming to change the battery while also facilitating an electrical connection between the battery terminals and the cable connectors or other electrical conductors of the vehicle or machine. The invention also relates to battery systems for vehicles including multiple batteries and systems for the automated power management thereof.

Every machine using an internal combustion engine requires a battery primarily to provide direct current for the starter mechanism, usually a starter motor geared to the cranking mechanism. For hybrid vehicles, the batteries are a more integral part of the vehicle's functionality. Batteries also store current for the operation of the machine's other electrical and electronic devices.

Although fully electric vehicles may be powered by a high-voltage battery, many have automotive batteries as well to provide for accessories which run on a standard voltage, such as 12 volts. There are also concerns with the battery used to power fully electric vehicles. For example, an operator of an electric vehicle may be stranded if the battery runs out of charge or unable to continue traveling due to the time needed to recharge the depleted battery.

Whether placed in the engine compartment of the machine or elsewhere, batteries must be securely held down in order to prevent movement and unwanted contact with the battery terminals. Most automobiles typically have a battery hold down mechanism for securing their batteries. The standard battery hold down mechanism uses nuts or locknuts to secure the battery with hold down rods and clamps. Battery replacement therefore tends to require tools, such as ratchets, extensions and sockets.

A vehicle battery, such as a 12 volt automotive battery, is a heavy and unwieldy component and must often be mounted within a confined space in the vehicle. Thus, battery replacement requires the dexterity to access hard to reach areas in the engine compartment. Furthermore, weather-beaten hold downs are subject to rust and corrosion, making it very difficult for the average consumer to disengage the battery from the hold down rods and hold down clamps. Even for technicians, replacing batteries, particularly ones with rusted nuts and bolts, can be difficult and time-consuming.

For at least the foregoing reasons, unfastening, replacing and fastening a vehicle battery in its designated location is known to be a somewhat difficult, burdensome and time-consuming task.

Accordingly, there is a need for improvement and solution to address the aforementioned issues that make the battery replacement process less difficult, cumbersome and time-consuming, among other things.

SUMMARY OF THE INVENTION

The invention is generally directed to improvements in vehicle battery securing devices.

Some embodiments of the invention are directed to a device for securing a replaceable vehicle battery having a protruding positive terminal and a protruding negative terminal, the device comprising: a substrate defining a first side and a second side, the substrate including a first receiving port extending through the substrate from the first side to the second side and a second receiving port extending through the substrate from the first side to the second side, wherein the first receiving port and second receiving port are positioned and dimensioned to receive the protruding positive terminal and the protruding negative terminals therein, respectively, and the substrate has a thickness from the first side to the second side that is less than the length of the protruding positive and negative terminals; a first spring-biased clamp mounted on the second side of the substrate, the first clamp including a first electrically conductive portion, wherein the first clamp is configured to engage the protruding positive terminal whereby the electrically first conductive portion is placed in electrical communication with the protruding positive terminal; and a second spring-biased clamp mounted on the second side of the substrate, the second clamp including a second electrically conductive portion, wherein the second clamp is configured to engage the protruding negative terminal whereby the second electrically conductive portion is placed in electrical communication with the protruding negative terminal.

In some embodiments, the substrate is positioned in a battery space defined by one or more walls.

In some embodiments, the one or more walls include a hinge, wherein the hinge is connected to the substrate to enable the substrate for pivotal motion.

In some embodiments, the first spring-biased clamp comprises first clamp opposing portions, each first clamp opposing portion having an inner surface and an outer surface, the first clamp opposing portions being mounted adjacent to the first receiving port, the first clamp opposing portions being biased towards one another whereby the protruding positive terminal forces the first clamp opposing portions to move outwardly responsive to being received by the first receiving port.

In some embodiments, the second spring-biased clamp comprises second clamp opposing portions, each second clamp opposing portion having an inner surface and an outer surface, the second clamp opposing portions being mounted adjacent to the second receiving port, the second clamp opposing portions being biased towards one another whereby the protruding negative terminal forces the second clamp opposing portions to move outwardly responsive to being received by the second receiving port.

In some embodiments, the first electrically conductive portion comprises the inner surfaces of the first clamp opposing portions.

In some embodiments, the second electrically conductive portion comprises the inner surfaces of the second clamp opposing portions.

Other embodiments, features and advantages of the invention will be readily appreciated and apparent from the following detailed description when considered in connection with the accompanying drawings.

BRIEF DESCRIPTION OF THE DRAWINGS

Various advantages of the invention will be readily appreciated as the same becomes better understood by reference to the following detailed description when considered in connection with the accompanying drawings. The components in the figures are not necessarily to scale, emphasis instead being placed upon illustrating the principles of the invention.

DETAILED DESCRIPTION OF THE INVENTION

The following detailed description provides exemplary embodiments of devices for securing batteries, and in particular, vehicle batteries. It will be readily understood from the description of the embodiments of the invention herein, and the elements thereof, could be alternatively configured within the scope of the invention. This description is therefore intended to generally describe and illustrate examples of the invention, but is not intended to limit the scope of the invention to the examples, embodiments and elements described herein.

Figure 1:
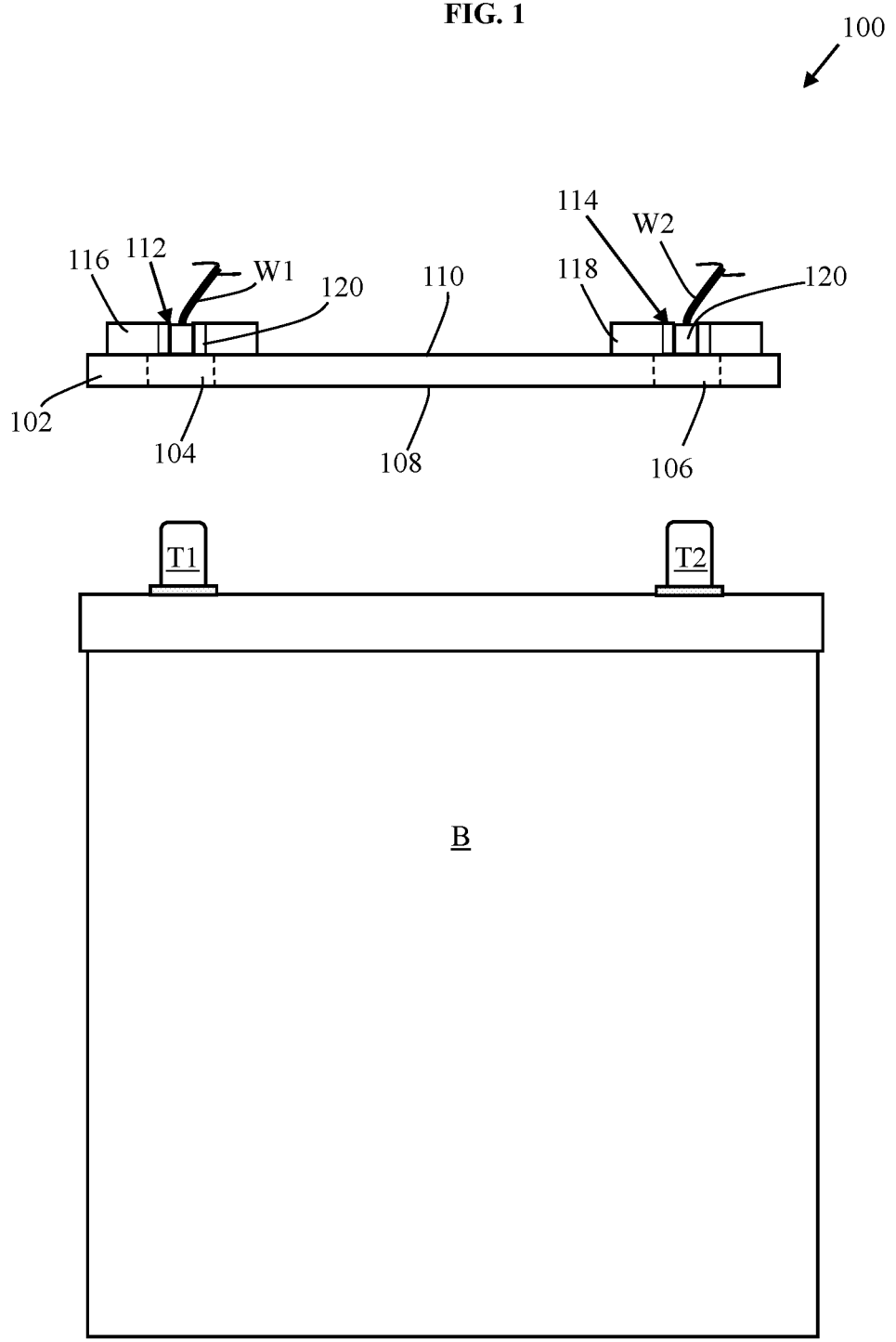
FIG. 1 is a schematic view of a system constructed in accordance with an embodiment of the invention.

FIG. 1 illustrates a battery mounting and securing device 100 for securing a battery B, including a connecting plate 102 having receiving ports 104 and 106 configured and dimensioned to receive battery terminals T1 and T2, respectively.

In this embodiment, ports 104 and 106 extend from a first side 108 of plate 102 to a second side 110 opposing first side 108. Second side 110 includes electrical connectors 112 and 114 for forming an electrical connection with terminals T1 and T2 responsive to terminals T1 and T2 being inserted and received by ports 104 and 106, respectively.

Connectors 112 and 114 may be further connected with wires W1 and W2 for enabling a flow of electricity from battery B to other components, such as a vehicle starter motor or accessory devices. In some embodiments, electrical connectors 112 and 114 include a device or mechanism for securely forming a non-permanent engagement with terminals T1 and T2 to facilitate the integrity of the electrical communication with connectors 112 and 114. In this embodiment, biased clamping mechanisms or clamps 116 and 118 are mounted on second side 110 of plate 102 in a position adjacent to ports 104 and 106, respectively.

Figure 2:
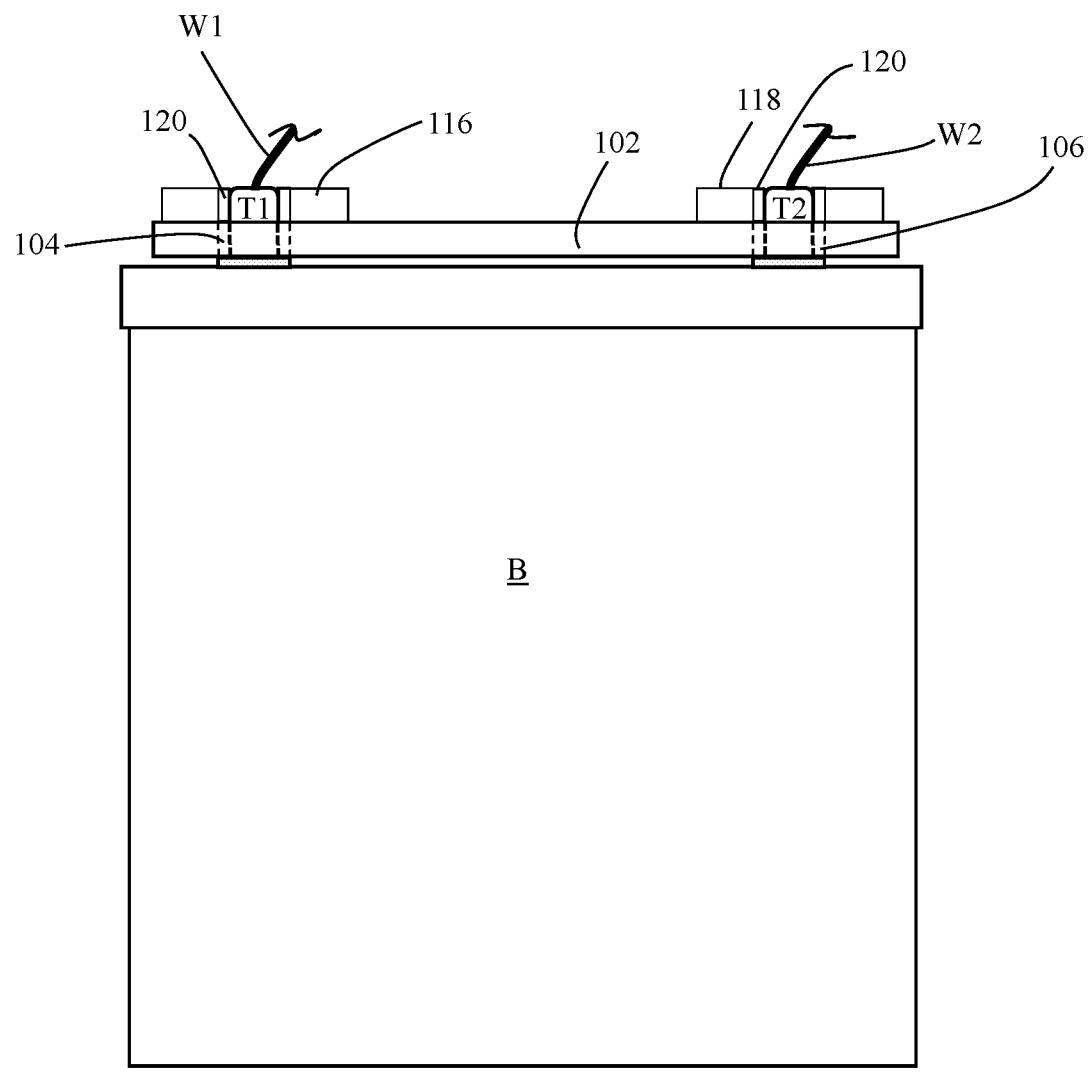
FIG. 2 is depicts the embodiment of the invention shown in FIG. 1, illustrating the connection of the substrate with the battery terminals.
Figure 3:
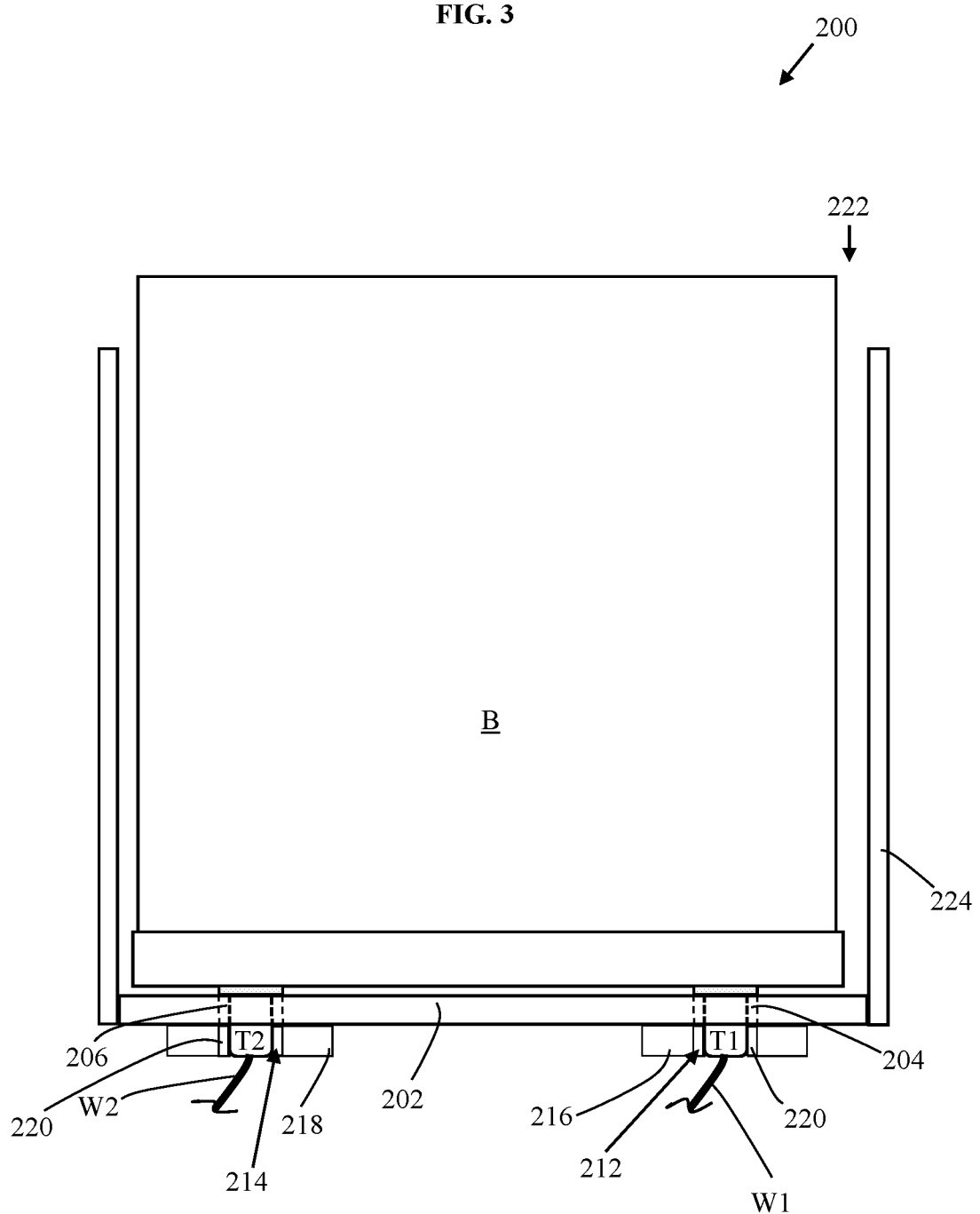
FIG. 3 is a schematic view of another embodiment of the invention.
Figure 4:
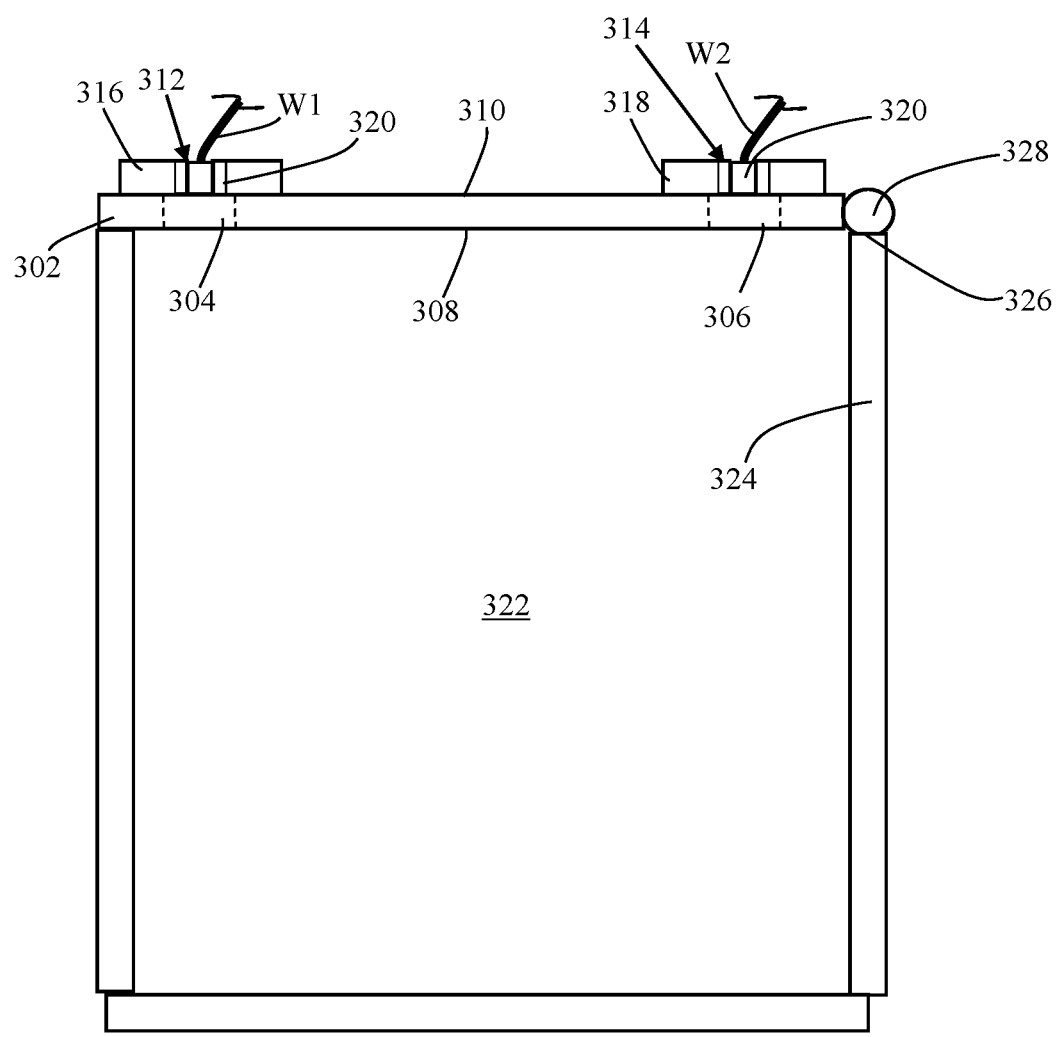
FIG. 4 is a schematic view of yet another embodiment of the invention.

Clamps 116 and 118 may be spring-biased clamps which comprise electrical connectors 112 and 114 such that clamps 116 and 118 securely engage with terminals T1 and T2 physically, while also enabling electrical communication between terminals T1 and T2 and connectors 112 and 114. Each clamping portion 120 of clamps 116 and 118 may be configured to open or expand outwardly responsive to terminals T1 and T2 being received in ports 104 and 106, as shown in FIG. 2, while remaining biased to facilitate the electrical communication with connectors 112 and 114. Each clamping portion 120 of clamps 116 and 118 may also include gripping portions or otherwise be manually operable, such as being openable against the biasing action, for being securely engaged with terminals T1 and T2.

It should be understood that plate 102 may be operatively associated with other battery hold down mechanisms or features to facilitate seating battery B in a vehicle. For example, a system 200 includes a plate 202 that comprises a bottom or bottom portion of a battery holding space 222 within a vehicle. Space 222 in this embodiment is further defined by one or more walls 224 to facilitate securing batter B in space 222. The positioning of plate 202 as the bottom of space 222 enables battery B to be inserted downward into space 222 with terminals T1 and T2 subsequently being received in ports 204 and 206 and forming an electrical connection between terminals T1 and T2 and connectors 212 and 214, respectively.

In other embodiments, a battery holding space 322 may include one or more walls 324 having an edge 326 with a hinged or other connection 328 with plate 302 to enable pivotal motion of plate 302. In this embodiment, hinged connection 328 enables plate 302 to be pivoted between a first position allowing access to space 322, whereby battery B can be placed therein, a second position, whereby plate 302 is pivoted over space 322 and terminals T1 and T2 can be received by ports 304 and 306 and subsequently secured by clamps 316 and 318 to be placed into electrical communication with connectors 312 and 314. It should be understood that walls 324 are for illustrative purposes only, and may comprise any structural component having suitable stability, such as a bar, beam, frame or framework for example, and may also comprise or include existing parts of holding space 322 for purposes of retrofitting a system 300, or other system constructed in accordance with the invention, within a vehicle.

Figure 5:
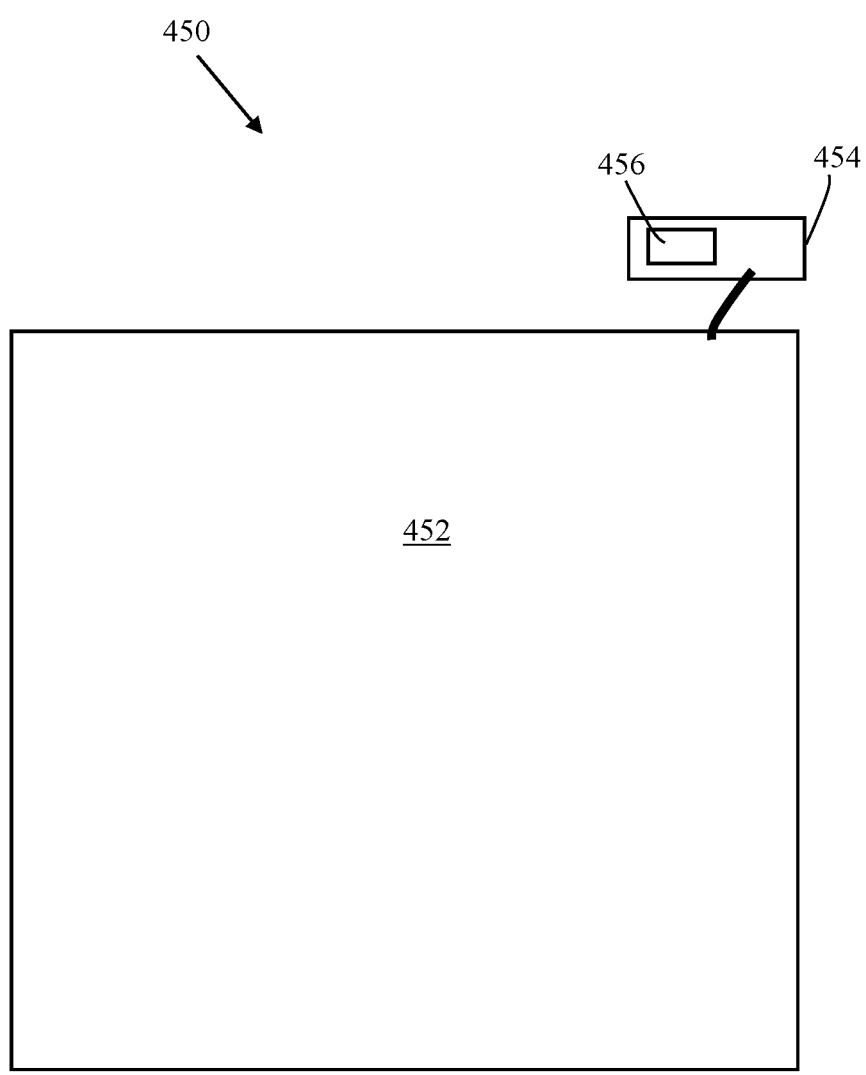
FIG. 5 is a schematic view of a battery group and battery management system which is particularly well-suited for use with an electric vehicle and constructed in accordance with the invention.

As shown in FIG. 5, the invention is directed to a vehicle battery system 450 including a battery group 452 comprising two or more batteries connected with one another and a cooperating mounting system inside a vehicle to supply power to a vehicle sequentially, that is, with each battery being used and depleted one at a time such that when a first battery is fully exhausted the second battery remains fully charged and so on until the power of the last battery in the group 452 is depleted.

System 450 further include a battery management device 454 having sensors for monitoring conditions relating to the battery group 452, such as group and each battery voltage, voltage drop, electrical capacity and electrical charge, among other things, and an automated mechanism for facilitating the sequential use of each battery in group 452 as described above.

In this embodiment battery management device 454 includes a specialized computer 456 which may include circuitry connected to group 452 for monitoring the charge remaining in each battery in group 452, determining power usage and estimated remaining time or charge left in each battery in group 452, and thereafter switching between batteries within group 452 to withdraw, use and receive electrical power.

Computer 456 may include hardware such as a processor and memory containing software programming executable by the processor, as well as a data communication device for communicating with a gauge or display device within the passenger compartment of the vehicle, such as a display device comprising the vehicle dashboard. The gauge or display may indicate the remaining electrical charge per battery in group 452, estimated time to battery depletion in each battery within group 452, estimated mileage, distance or time available for continued operation (which may adjust as needed during usage of the vehicle and based on temperature readings from a sensor included with management device 454).

Figure 6:
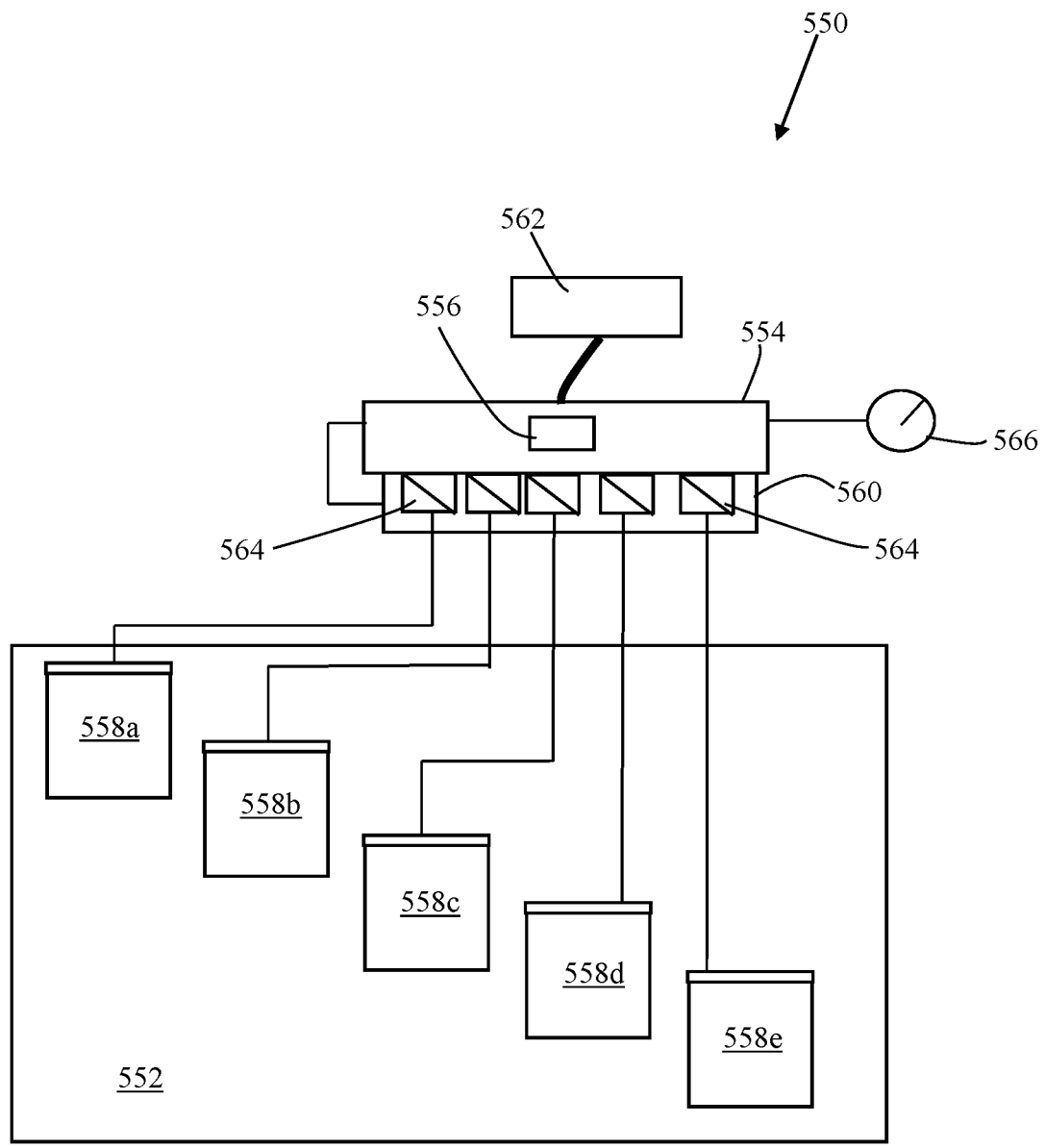
FIG. 6 is a schematic view of an embodiment of the system shown in FIG. 5.

As shown in FIG. 6, a system 550 includes battery group 552 includes five batteries 558a, 558b, 558c, 558d and 558e engaged with a wiring harness 560 which connects with the internal vehicle wiring connection 562. It should be understood that five batteries are shown as an example and not to be construed as limiting of the number of batteries that may be used in connection with the embodiments of the invention, including as part of a battery group such as battery group 552.

Power from battery group 552 connections with wiring harness 560 powers battery management device 554 and computer 556 therein. Wire connections between harness 560 and each battery 558a-e enable management device 554 to monitor battery conditions such as voltage in each of the batteries 558a-e, and said wire connections further incorporate circuitry to establish electrical communication with each battery 558a-e and the supply of electrical current to vehicle wiring connection 562.

Responsive to management device 554 detecting depletion of voltage in one of the batteries 558a-e, which may be a detection of a voltage which is less than a threshold voltage, management device 554 actuates a battery switching routine to enable electrical communication with another of the batteries 558a-e.

In this embodiment, the battery switching routine involves the circuit created by the wired connections between harness 560 and batteries 558a-e with one or more switches or relays 564 in electrical communication with each battery 558a-e and management device 554. Relays 564 are alternately switched on and off, that is, opened and closed, by receiving an electrical signal from management device 554. Management device 554 thus maintains all relays 564 in an open position so that no circuit is formed between four of the five batteries 558a-e, while a single relay 564 is closed to form a circuit with one of batteries 558a-e until the voltage in that battery is less than a threshold voltage. Responsive to the battery of batteries 558a-e from which electrical current is being received having a voltage less than the threshold voltage, management device 554 transmits an electrical signal to close an open relay 564 associated with another of battery 558a-e, thus completing a circuit for electrical communication from battery to vehicle wiring connection 562.

In order to maintain a constant electrical connection, management device 554 may close the open relay 564 for the other battery 558a-e while either simultaneously or within a preset period of time thereafter opening the first closed relay 564. Once the other battery 558a-e is reduced below a threshold voltage, the process repeats itself until all batteries 558a-e are depleted in series, though it is presumed that the depleted batteries 558a-e will be replaced by a fully charged battery, such as by the vehicle owner/operator or service station attendant, or possibly recharged before the final battery 558a-e falls below the threshold voltage value. Each time a battery 558a-e falls below the threshold voltage, management device 554 causes the display device or gauge 566 to visually indicate the event so that the vehicle operator is made aware of the condition of batteries 558a-e.

Systems and methods of the invention, including systems 450 and 550, are particularly well-suited for use in fully electric vehicles. Dividing a single or even multiple batteries into more manageable, easily and readily replaceable smaller batteries, various issues, such as the issues associated with battery power management, recharge time and hassle, are largely if not fully resolved. The use of such systems and methods of the invention will substantially reduce the need for electric vehicle charging stations and the exorbitant costs (in money and time) of erecting such an infrastructure to support long-distance travel using fully electric vehicles. In addition, to facilitate battery removal and replacement in the battery group, the battery mounting and securing device of the invention such as device 100 discussed above may be used to securely connect each battery 558a-e with the wired connections with harness 560 and/or management device 554.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary devices, apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A device for securing a replaceable vehicle battery in a battery space defined by one or more walls, the replaceable vehicle battery having a protruding positive terminal and a protruding negative terminal, the protruding positive terminal having a first length and the protruding negative terminal having a second length, the device comprising:

a) a substrate defining a body including a first side and a second side, the substrate including a first receiving port extending through the substrate from the first side to the second side and a second receiving port extending through the substrate from the first side to the second side, wherein the first receiving port and second receiving port are positioned on the substrate and dimensioned to enable the first receiving port and the second receiving port included in the substrate to receive both the protruding positive terminal and the protruding negative terminals therein, respectively, and the substrate has a thickness from the first side to the second side that is less than both the first length of the protruding positive terminal and the second length of the protruding negative terminal, the substrate being configured to enable both a first portion of the first length of the protruding positive terminal to protrude from the second side and a second portion of the second length of the protruding negative terminal to protrude from the second side;

b) a first clamp mounted on the second side of the substrate, the first clamp including a first electrically conductive portion, wherein the first clamp is positioned adjacent to the first receiving port on the second side and configured to engage the first portion of the first length of the protruding positive terminal whereby the electrically first conductive portion is placed in electrical communication with the protruding positive terminal; and c) a second clamp mounted on the second side of the substrate, the second clamp including a second electrically conductive portion, wherein the second clamp is positioned adjacent to the second receiving port on the second side and configured to engage the second portion of the second length of the protruding negative terminal whereby the second electrically conductive portion is placed in electrical communication with the protruding negative terminal, wherein the first side of the substrate faces the replaceable vehicle battery in the battery space, the first receiving port and second receiving port of the substrate receive the protruding positive terminal and the protruding negative terminal of the replaceable vehicle battery in the battery space, and wherein the first clamp and the second clamp are each respectively biased by a clamping force, whereby the first clamp engages the first portion of the first length of the protruding positive terminal and the second clamp engages the second portion of the second length of the protruding negative terminal.

2. The device as recited in claim 1, further comprising a hinge connected to the substrate and a wall of the one or more walls of the battery space, wherein the substrate is enabled for pivotal motion to the battery space.

3. The device as recited in claim 1, wherein the first clamp and the second clamp are spring-biased.

4. The device as recited in claim 1, wherein the first clamp is configured to be forced open by the first length of the protruding positive terminal responsive to the protruding positive terminal being received by the first receiving port.

5. The device as recited in claim 1, wherein the second clamp is configured to be forced open by the second length of the protruding negative terminal responsive to the protruding negative terminal being received by the second receiving port.

6. The device as recited in claim 1, wherein the first electrically conductive portion comprises an inner surface of at least two opposing portions of the first clamp.

7. The device as recited in claim 6, wherein the second electrically conductive portion comprises an inner surface of at least two opposing portions of the second clamp.

8. A device for securing a replaceable vehicle battery in a battery space defined by one or more walls, the replaceable vehicle battery having a protruding positive terminal and a protruding negative terminal, the protruding positive terminal having a first length and the protruding negative terminal having a second length, the device comprising:

a) a substrate defining a body including a first side and a second side, the substrate including a first receiving port extending through the substrate from the first side to the second side and a second receiving port extending through the substrate from the first side to the second side, wherein the first receiving port and second receiving port are positioned on the substrate and dimensioned to enable the first receiving port and the second receiving port included in the substrate to receive both the protruding positive terminal and the protruding negative terminals therein, respectively, and the substrate has a thickness from the first side to the second side that is less than both the first length of the protruding positive terminal and the second length of the protruding negative terminal, the substrate being configured to enable both a first portion of the first length of the protruding positive terminal to protrude from the second side and a second portion of the second length of the protruding negative terminal to protrude from the second side;

b) a first clamp mounted on the second side of the substrate, the first clamp including a first electrically conductive portion, wherein the first clamp is positioned adjacent to the first receiving port on the second side and configured to engage the first portion of the first length of the protruding positive terminal whereby the electrically first conductive portion is placed in electrical communication with the protruding positive terminal; and c) a second clamp mounted on the second side of the substrate, the second clamp including a second electrically conductive portion, wherein the second clamp is positioned adjacent to the second receiving port on the second side and configured to engage the second portion of the second length of the protruding negative terminal whereby the second electrically conductive portion is placed in electrical communication with the protruding negative terminal, wherein the first side of the substrate faces the replaceable vehicle battery in the battery space, the first receiving port and second receiving port of the substrate receive the protruding positive terminal and the protruding negative terminal of the replaceable vehicle battery in the battery space, and wherein the first clamp is configured to clamp onto the first length of the protruding positive terminal responsive to the protruding positive terminal being received by the first receiving port, and wherein the second clamp is configured to clamp onto the second length of the protruding negative terminal responsive to the protruding negative terminal being received by the second receiving port.

9. The device as recited in claim 8, further comprising a hinge connected to the substrate and a wall of the one or more walls of the battery space, wherein the substrate is enabled for pivotal motion to the battery space.

10. The device as recited in claim 8, wherein the first clamp and the second clamp are spring-biased.

11. The device as recited in claim 8, wherein the first clamp and the second clamp are each respectively biased by a clamping force.

12. The device as recited in claim 11, wherein the first clamp is configured to be forced open by the first length of the protruding positive terminal responsive to the protruding positive terminal being received by the first receiving port.

13. The device as recited in claim 11, wherein the second clamp is configured to be forced open by the second length of the protruding negative terminal responsive to the protruding negative terminal being received by the second receiving port.

14. The device as recited in claim 8, wherein the first electrically conductive portion comprises an inner surface of at least two opposing portions of the first clamp.

15. The device as recited in claim 8, wherein the second electrically conductive portion comprises an inner surface of at least two opposing portions of the second clamp.

16. The device as recited in claim 8, further comprising a hinge connected to the substrate and a wall of the one or more walls of the battery space, wherein the substrate is enabled for pivotal motion to the battery space.

17. The device as recited in claim 8, wherein the first clamp and the second clamp are spring-biased.

18. The device as recited in claim 8, wherein the first clamp and the second clamp are each respectively biased by a clamping force.

19. A device for securing a replaceable vehicle battery in a battery space defined by one or more walls, the replaceable vehicle battery having a protruding positive terminal and a protruding negative terminal, the protruding positive terminal having a first length and the protruding negative terminal having a second length, the device comprising:
  a) a substrate defining a body including a first side and a second side, the substrate including a first receiving port extending through the substrate from the first side to the second side and a second receiving port extending through the substrate from the first side to the second side, wherein the first receiving port and second receiving port are positioned on the substrate and dimensioned to enable the first receiving port and the second receiving port included in the substrate to receive both the protruding positive terminal and the protruding negative terminals therein, respectively, and the substrate has a thickness from the first side to the second side that is less than both the first length of the protruding positive terminal and the second length of the protruding negative terminal, the substrate being configured to enable both a first portion of the first length of the protruding positive terminal to protrude from the second side and a second portion of the second length of the protruding negative terminal to protrude from the second side;
  b) a first clamp mounted on the second side of the substrate, the first clamp including a first electrically conductive portion, wherein the first clamp is positioned adjacent to the first receiving port on the second side and configured to engage the first portion of the first length of the protruding positive terminal whereby the electrically first conductive portion is placed in electrical communication with the protruding positive terminal; and
  c) a second clamp mounted on the second side of the substrate, the second clamp including a second electrically conductive portion, wherein the second clamp is positioned adjacent to the second receiving port on the second side and configured to engage the second portion of the second length of the protruding negative terminal whereby the second electrically conductive portion is placed in electrical communication with the protruding negative terminal, wherein the first side of the substrate faces the replaceable vehicle battery in the battery space, the first receiving port and second receiving port of the substrate receive the protruding positive terminal and the protruding negative terminal of the replaceable vehicle battery in the battery space, and wherein the first clamp is configured to be forced open by the first length of the protruding positive terminal and clamp onto the first length of the protruding positive terminal responsive to the protruding positive terminal being received by the first receiving port, and wherein the second clamp is configured to be forced open by the second length of the protruding negative terminal and clamp onto the second length of the protruding negative terminal responsive to the protruding negative terminal being received by the second receiving port.

* * * * *